(12) United States Patent
Sumser et al.

(10) Patent No.: US 7,021,057 B2
(45) Date of Patent: Apr. 4, 2006

(54) EXHAUST-GAS TURBOCHARGER FOR AN INTERNAL COMBUSTION ENGINE WITH VARIABLE TURBINE GEOMETRY

(75) Inventors: Siegfried Sumser, Stuttgart (DE); Peter Fledersbacher, Stuttgart (DE); Hans-Josef Hemer, Worms (DE); Ralf Koch, Ruessingen (DE)

(73) Assignees: DaimlerChysler AG, Stuttgart (DE); 3K-Warner Turbosystems GmbH, Kirchheimbolanden (DE)

( * ) Notice: Subject to any disclaimer, the term of this patent is extended or adjusted under 35 U.S.C. 154(b) by 373 days.

(21) Appl. No.: 10/401,278

(22) Filed: Mar. 27, 2003

(65) Prior Publication Data

US 2003/0194333 A1   Oct. 16, 2003

Related U.S. Application Data

(63) Continuation-in-part of application No. PCT/EP01/10615, filed on Sep. 14, 2001.

(30) Foreign Application Priority Data

Sep. 28, 2000   (DE) ................................ 100 48 105

(51) Int. Cl.
*F02D 23/00* (2006.01)
*F02B 37/12* (2006.01)
*F04B 17/00* (2006.01)
*F01D 17/12* (2006.01)

(52) U.S. Cl. .................. 60/602; 415/163; 415/164; 417/407

(58) Field of Classification Search .................. 60/602; 415/159–161, 163–165; 417/406–407
See application file for complete search history.

(56) References Cited

U.S. PATENT DOCUMENTS

| 2,860,827 | A | * | 11/1958 | Egli | 415/164 |
| 3,101,926 | A | * | 8/1963 | Weber | 415/163 |
| 3,645,645 | A | * | 2/1972 | Gammill et al. | 415/163 |
| 5,092,126 | A | * | 3/1992 | Yano | 60/602 |
| 5,454,225 | A | * | 10/1995 | Sumser et al. | 60/602 |
| 6,220,031 | B1 | * | 4/2001 | Daudel et al. | 60/602 |
| 6,256,991 | B1 | * | 7/2001 | Schmidt et al. | 60/602 |
| 6,571,558 | B1 | * | 6/2003 | Finger et al. | 417/407 |
| 6,739,134 | B1 | * | 5/2004 | Fledersbacher et al. | 60/602 |

* cited by examiner

*Primary Examiner*—Thai-Ba Trieu
(74) *Attorney, Agent, or Firm*—Klaus J. Bach

(57) ABSTRACT

In an exhaust gas turbocharger for an internal combustion engine comprising a radial flow exhaust gas turbine and a compressor, which is connected to the turbine via a shaft, the turbine having a radial inflow duct and a radial inlet flow passage, which leads to the turbine wheel and in which a variable geometry vane structure for changing the cross-section of the radial inlet flow passage is supported between two support walls fixed to the turbine casing, one of the support walls projects into the inflow duct, in such a manner that the rear side of this support wall is spaced from the inner wall of the inflow duct wall so that the exhaust gas within the inflow duct is in contact also with the rear side of this support wall.

7 Claims, 3 Drawing Sheets

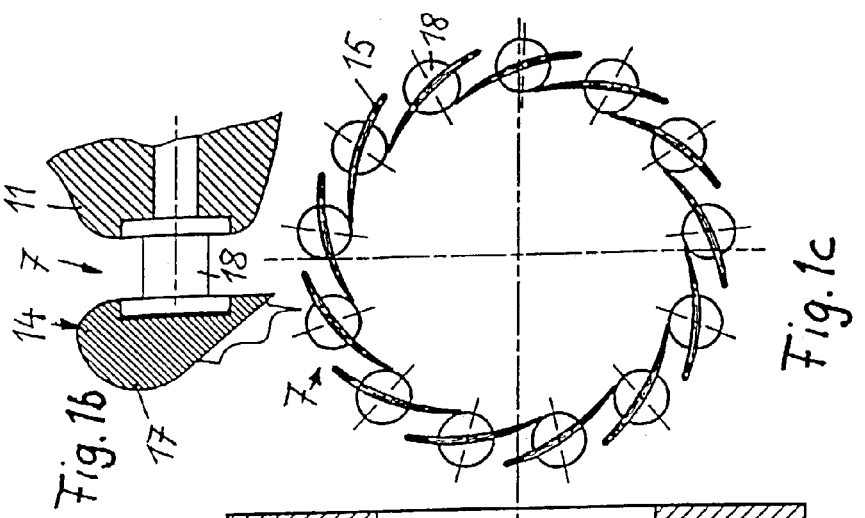
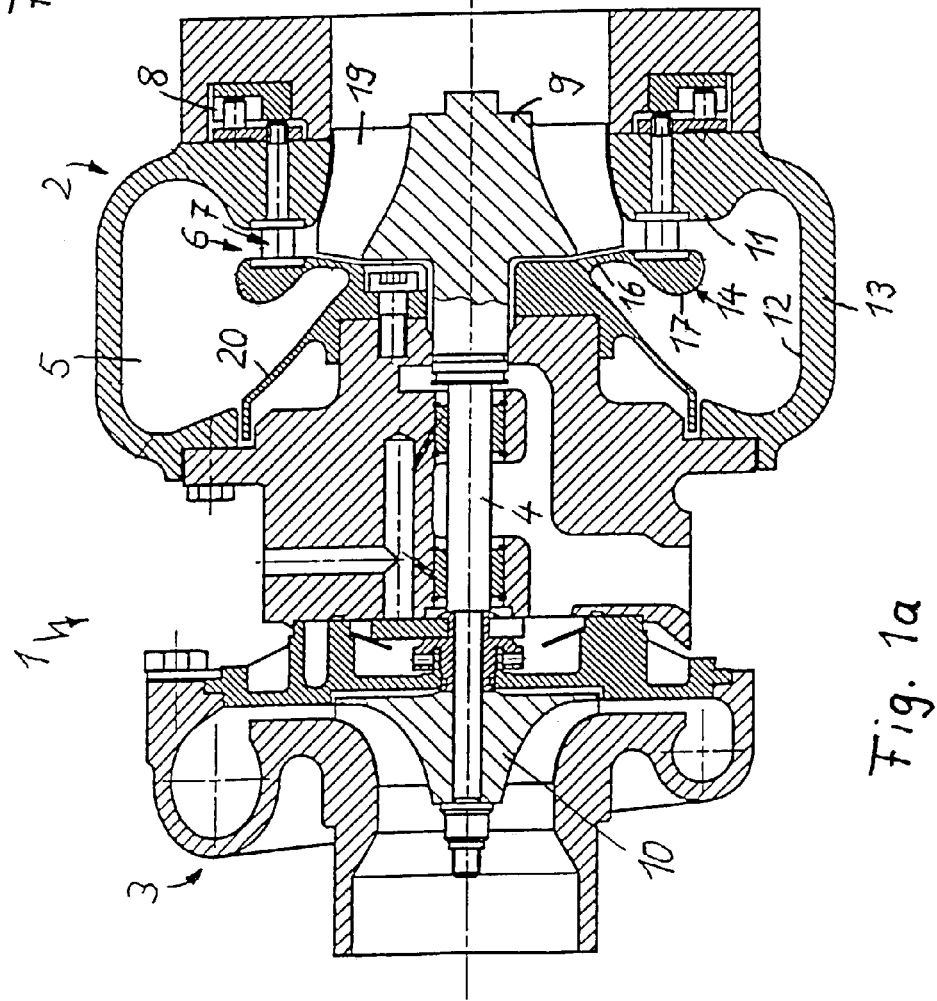

EXHAUST-GAS TURBOCHARGER FOR AN INTERNAL COMBUSTION ENGINE WITH VARIABLE TURBINE GEOMETRY

This is a Continuation-In-Part application of international application PCT/EP01/10615 filed Sep. 14, 2001 and claiming the priority of German application 100 48 105.1 filed Sep. 28, 2000.

BACKGROUND OF THE INVENTION

The invention relates to a gas-exhaust gas turbocharger for an internal combustion engine with variable turbine geometry.

DE 35 41 508 C1 discloses an exhaust-gas turbocharger, the exhaust-gas turbine of which is designed as a radial turbine which has a radial inflow passage through which exhaust gas flows via a radial flow inlet cross-section into the turbine section and onto a turbine wheel. A variable turbine geometry in the form of a guide vane ring with adjustable guide vanes, is arranged in the flow inlet cross-section. The guide vanes can be adjusted between a throttling position, which reduces the free flow inlet cross-section to the turbine wheel, and an open position, which widens the flow inlet cross-section as a function of the current operating state of the internal combustion engine. As a result the exhaust gas back pressure in the line section between the cylinder exhaust passage and the exhaust-gas turbine can be manipulated and set to a desired level. Exhaust-gas turbines of this type can be used both in the driving mode of the engine to increase the engine power and in the engine braking mode to generate engine-braking power.

Particularly in the engine-braking mode, the guide vanes are moved into the throttling position, in order to produce a high pressure level on both the exhaust-gas side and the air supply side in order to generate the desired high engine-braking powers. To make it possible to generate high exhaust-gas back-pressures, it is necessary to avoid incorrect air flows between the inlet passage of the turbine and the discharge side of the turbine. Undesirable incorrect air flows of this nature may be produced by gaps which may form in the region where the radial guide vanes are held in place at the end faces of the guide vanes, because of thermal and mechanical loads. Particularly in the case of commercial vehicle engines, which have to be able to generate a high engine-braking power, accurate mounting of the guide vanes combined, with a reduced thermal and mechanical load on the vanes is desirable in order to avoid incorrect air flows.

It is already known from U.S. Pat. No. 5,454,225 to provide a support wall, which is fixed to the casing, in the inflow passage of the exhaust-gas turbine. Although this support wall is fixedly connected to the turbine casing, it projects freely into the inflow passage. This support wall is used to support a variable turbine geometry in the radial flow inlet cross section to the turbine wheel. The support wall is of annular design, with the cross section of the support wall widening radially outwards. The variable turbine geometry is in the form of an adjustable guide vane structure in the radial flow inlet cross section. The guide vane structure is held, in the region of one of its end faces, on an outer casing wall and, in the region of its opposite end face, on the projecting-support wall.

Because of the widening of the cross section in the radial direction of the support wall, the support wall has a contour which is favorable for guiding the exhaust gas. The guide vane ring of the variable turbine geometry is mounted in the region of a narrow cross section of the support wall, directly adjacent to the radially outer end of the turbine wheel. The support wall is attached to the turbine casing by means of a semi-axial guide vane ring, via which exhaust gas can be fed to the turbine wheel in addition to the gas fed to the radial guide vane ring. With the guide vane ring, the supporting wall has a relatively high rigidity, which helps to transmit vibrations from the turbine casing to the supporting wall and to the variable turbine geometry. However, vibrations of this type, if they exceed an acceptable level, can adversely affect the operation of the variable turbine geometry.

It is the object of the invention to provide an exhaust-gas turbocharger, which has a high efficiency and a long service life.

SUMMARY OF THE INVENTION

In an exhaust gas turbocharger for an internal combustion engine comprising a radial flow exhaust gas turbine and a compressor, which is connected to the turbine via a shaft, the turbine having a radial inflow duct and a radial inlet flow passage, which leads to the turbine wheel and in which a variable geometry vane structure for changing the cross-section of the radial inlet flow passage is supported between two support walls fixed to the turbine casing, one of the support walls projects into the inflow duct, in such a manner that the rear side of this support wall is spaced from the inner wall of the inflow duct wall so that the exhaust gas within the inflow duct is in contact also with the rear side of this support wall.

The rear face of this supporting wall is exposed to the exhaust gas in the inflow duct so that not only the front face of the support wall in the region of the variable turbine geometry but also the rear face of the support wall comes into contact with the exhaust gas and the surface of the support wall is heated substantially uniformly, which leads to a reduction in thermal stresses in this component. As a result, the thermal expansion of the support wall approximately corresponds to the expansion of the opposite, second support wall, so that the relative distance between the two support walls remains substantially unchanged over a wide range of temperatures, and undesirable air flows between the end faces of the radial guide vanes and the delimiting supporting walls are avoided.

A further advantage resides in the mechanical de-coupling of the support wall which projects into the exhaust gas inlet passage from the casing of the turbine. Unlike in the prior art, the projecting support wall is only connected to the casing of the turbine at one end thereof, with the result that the transmission of vibrations between casing and projecting support wall is reduced compared to designs in which there is contact with the casing over the entire surface of one side of the wall. Moreover, the projecting support wall has a greater degree of resilience, since the support wall projects freely into the inflow duct and is not supported over a large area to a component fixed to the casing.

The mechanical de-coupling effect can be increased by means of a defined wall thickness distribution and a resultant adaptation of the flexural rigidity over the length of the projecting support wall, for example by the fact that, according to an advantageous embodiment, the support wall has a narrowed cross-section which lies in particular between the end of the support wall to the casing of the turbine and the location where the variable turbine geometry is mounted. The narrowed cross section allows flexurally resilient yielding on the part of the projecting support wall, in order to compensate for thermal expansions. By contrast, in the region where the variable turbine vane structure is mounted, the support wall is advantageously relatively thick, so that the turbine inlet vane structure can be fastened securely in place.

According to a further advantageous embodiment, the support wall is designed as an independent component which is separate from the casing of the exhaust-gas turbocharger, so that the support wall can be made from a material different from that of which the casing walls consists which delimit the inflow passage. Accordingly, they may have different mechanical and/or thermal properties to the support wall. The design as an independent component in particular reduces the transmission of vibrations between the support wall and the other casing walls.

It may be advantageous for the support wall to be combined with a heat shield, which forms part of the inner wall of the exhaust gas inlet passage and shields heat-sensitive components of the exhaust-gas turbocharger from overheating.

On one end side of the turbine wheel, the projecting support wall expediently extends at least over the radially outer region of the turbine wheel and as a result delimits the gas inlet passage, which is advantageously helical, from the outflow region, in which the turbine wheel is rotatably received. This embodiment is distinguished by a compact overall shape.

The invention will be described below in greater detail on the basis of the accompanying drawings:

BRIEF DESCRIPTION OF THE DRAWINGS

FIG. 1a shows a section through an exhaust-gas turbocharger for an internal combustion engine, the exhaust-gas turbine of which is designed as a radial turbine and is equipped with a variable geometry vane structure in the radial gas inlet passage to the turbine wheel, FIG. 1b shows enlarged the radial inflow region of the turbine with an adjustable element of the variable geometry vane structure, FIG. 1c is a plan view of the variable geometry vanes, designed as a guide ring with movable guide vanes.

DESCRIPTION OF PREFERRED EMBODIMENTS

Figure 2:
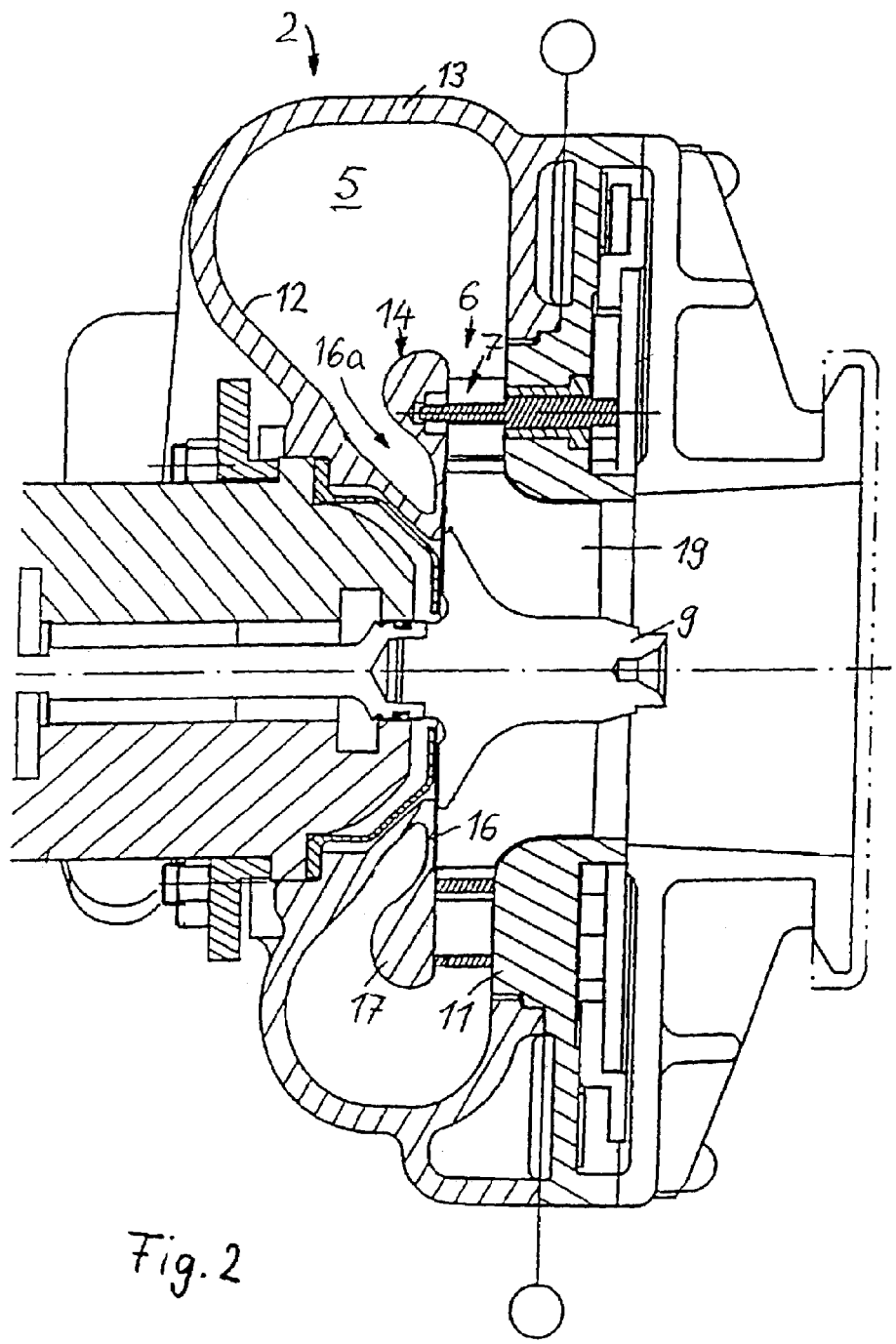
FIG. 2 shows a section through another exhaust-gas turbine embodiment.

Throughout the following figures, identical components are in each case provided with the same reference numerals.

The exhaust-gas turbocharger 1 for an internal combustion engine, which is illustrated in FIG. 1a, comprises an exhaust-gas turbine, in the form of a radial turbine 2, and a compressor 3. A turbine wheel 9 of the radial turbine 2 is connected in a rotationally fixed manner, via a shaft 4, to a compressor impeller 10 of the compressor 3. When the internal combustion engine is operating, exhaust gas from the engine is passed into a radial gas inlet duct of the radial turbine and fed via a radial inlet flow passage to the turbine wheel 9, the rotation of which is transmitted via the shaft 4 to the compressor impeller 10. As a result, combustion air, which has been sucked into the compressor 3, is compressed and is fed to the cylinder intake passages of the engine.

A variable turbine vane structure 7, which can be adjusted, by means of an actuating device 8, between a throttling position, which reduces the radial flow inlet cross section 6, and an open position, is arranged in the radial inlet flow passage 6 between the helical inflow duct 5 of the radial turbine 2 and the turbine wheel 9. The setting of the position of the variable turbine vane structure takes place as a function of the current engine operating characteristics for a controlled manipulation of the exhaust gas back pressure between the cylinder exhaust and radial turbine 2 and of the boost pressure of the air, which is to be fed to the engine. The variable turbine vane structure 7 is advantageously used to set the exhaust-gas back-pressure and the boost pressure as desired in both the engine driving mode and in engine-braking mode.

As can be seen from FIG. 1a in conjunction with FIGS. 1b and 1c, the variable turbine vanes structure 7 in the radial flow inlet flow passage 6 is designed as a guide vane ring having a plurality of guide vanes 15 which are distributed annularly and are mounted rotatably. Furthermore, the variable turbine geometry (guide vane structure) 7 is arranged in the casing 13 of the radial turbine 2, between two support walls 11 and 14 which are fixed to the turbine casing. The first support wall 11 is part of the inner wall 12 of the helical inflow duct 5 in the casing 13 of the radial turbine 2.

The second support wall 14 is arranged opposite the outer, first support wall 11, offset radially inwards into the interior space of the inflow duct 5, and projects into the interior space. This projecting support wall 14 has a thin-walled connecting section 16, by means of which the support wall 14 is fixed to the casing, and a thick-walled, radially outer end section 17, in which guide-vane carriers 18, are mounted and in which the guide vanes 15 of the variable turbine geometry, are accommodated. The thin-walled connecting section 16 reduces the flexural rigidity of the projecting support wall 14 and allows resilient yielding of the support wall 14 in the direction of the longitudinal axis of the guide-vane carrier 18, resulting in an at least partial mechanical de-coupling of the support wall 14 from the other casing parts of the radial turbine and also in a partial thermal de-coupling.

The thin-walled connecting section 16, which extends approximately radially with respect to the turbine axis, of the projecting supporting wall 14, spaces the inflow duct 5 from the rear side of the turbine wheel 9, in particular from the rear-side end wall region of the turbine-wheel blades 19 of the turbine wheel 9. The thin-walled connecting section 16 is disposed in a recess between inflow passage 5 and turbine wheel 9. The connecting section 16 may be either of continuous design, in order to suppress a semi-axial inflow of exhaust gas to the turbine wheel 9, or designed with flow openings, in order to allow a targeted inflow to the turbine wheel 9. In the latter case, a guide vane structure for controlling the flow may be provided in the flow openings.

Since the support wall 14 projects radially into the inflow passage 5, exhaust gas is in contact with both sides of the support wall 14, with the result that thermal stresses in the support wall are avoided and there is a uniform temperature-related expansion of the support wall 14.

In the exemplary embodiment shown in FIG. 1a, the projecting support wall 14 forms a single-part component with a heat shield 20, which delimits the radially inner side of the inflow duct 5 and thermally insulates sensitive components of the exhaust-gas turbocharger 1 from the hot exhaust gases in the inflow duct 5. The support wall 14 and heat shield 20 are preferably formed integrally and consist of the same material. This component is designed as an approximately annular component and is part of the exhaust-gas turbocharger 1.

In the exemplary embodiment shown in FIG. 2, the support wall 14 which projects into the inflow duct 5 is formed integrally with the wall of the casing 13; the support wall merges without interruption into the inner wall 12 of the gas inlet duct 5. The thin-walled connecting section 16 of the support wall 14 in the radial direction extends approximately over the radial height of the turbine-wheel blade 19. The inflow duct 5 is provided in the direction of the turbine wheel 9 with an approximately semi-axial recess 16*a*.

It may also be expedient for the thin-walled connecting section 16 to be relatively short in radial direction and in particular to be shifted into a region which lies further outwards in the radial direction, with the result that the semi-axial recess of the inflow duct 5 becomes less pronounced.

Figure 3:
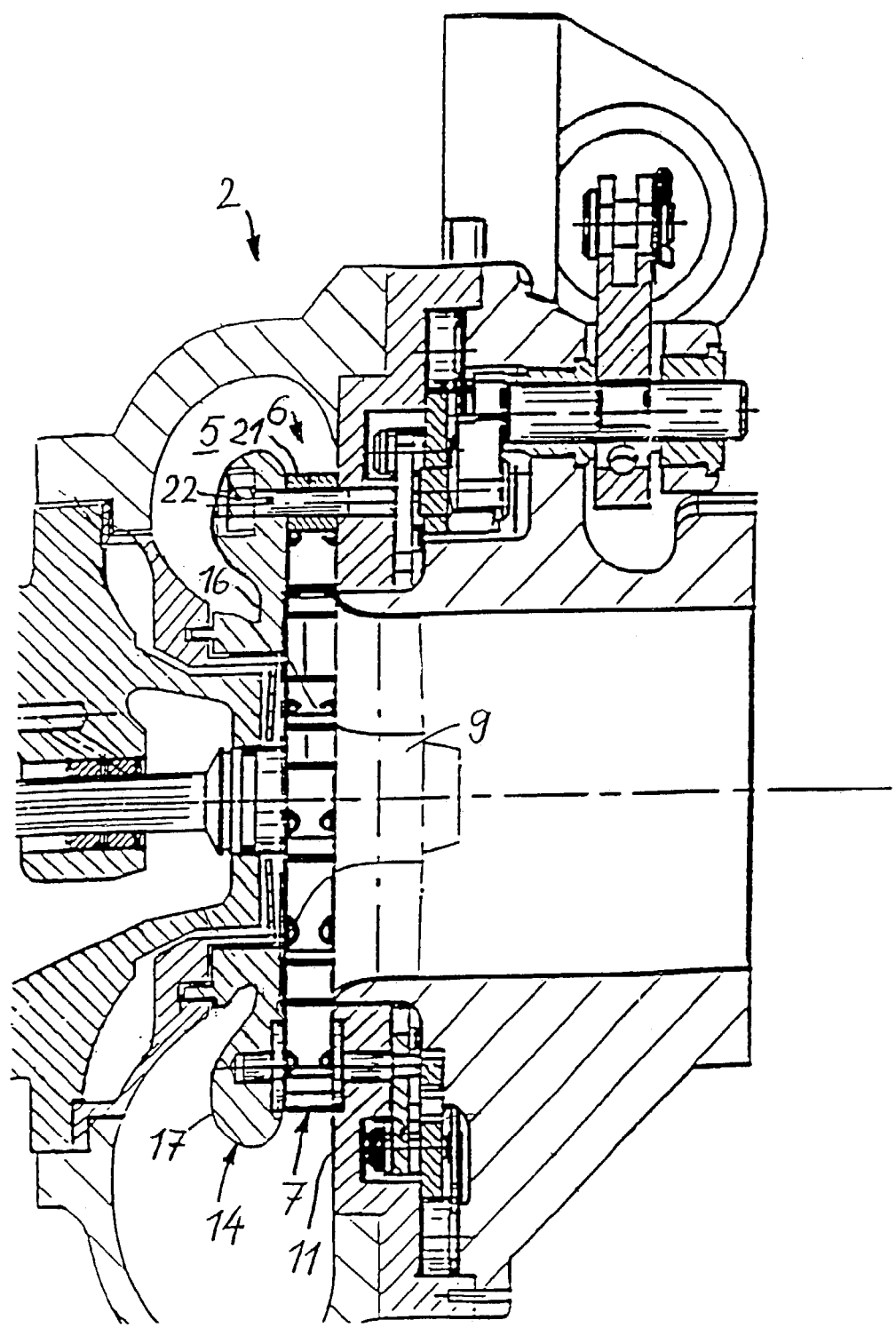
FIG. 3 shows a section through an exhaust-gas turbine of still another embodiment.

In the exemplary embodiment shown in FIG. 3, spacer bushes 21 are provided in the radial flow inlet passages 6 between inflow duct 5 and turbine wheel 9, in order to ensure that there is a defined minimum distance between the outer support wall 11 and the support wall 14, which projects radially into the inflow passage 5. This is in order to ensure friction-free adjusting movement of the guide vanes of the variable turbine vane structure 7. The variable turbine vane structure in the flow inlet flow passage 6 is fixed by means of bolts 22 which extend between the end section 17 of the support wall 14 and the support wall 11.

What is claimed is:

1. An exhaust gas turbocharger for an internal combustion engine, including in a casing (13) a shaft rotatably supported in said casing an exhaust gas turbine (2) and a compressor (3) at opposite ends of said shaft (4), said exhaust gas turbine (2) being a radial turbine with a radial gas inlet duct (5) and a gas inlet passage (6) for conducting exhaust gas to said turbine wheel (9) and a variable geometry vane structure (7) arranged in said gas inlet passage (6) between two spaced support walls (11, 14) of said casing, one of said support walls (14) projecting into the inflow duct (5), said support wall (14) having a rear side opposite the variable geometry vane structure (7), which is spaced from an inner wall portion (12) of the inflow duct (5), permitting exhaust gas to contact the rear of said projecting support wall (14), said projecting support wall (14) having a thick-walled end section (17) at its radially outer end for pivotally supporting the variable geometry vanes and a thin-walled connecting section (16) by means of which the support wall (14) is connected to the casing (13) of the exhaust gas turbine, the thin-walled connecting section (16) providing for axial resiliency of the projecting support wall (14).

2. An exhaust gas turbocharger according to claim 1, wherein the radially projecting support wall (14) is an independent component which is separate from the casing (13) of the exhaust gas turbocharger (1).

3. An exhaust gas turbocharger according to claim 2, wherein the radially projecting support wall (14) forms a common component with a heat shield (20) on the inner wall (12) of the inflow passage (5).

4. An exhaust gas turbocharger according to claim 3, wherein the radially projecting support wall (14) is arranged on an end side of the turbine wheel (9) and extends at least over the radially outer region of the turbine wheel (9).

5. An exhaust gas turbocharger according to claim 1, wherein the variable geometry vane structure (7) comprises a guide structure with movable guide vanes (15) disposed between the support walls (11, 14).

6. An exhaust gas turbocharger according to claim 1, wherein spacer bushes (21) are provided in the space between the support walls (11, 14).

7. An exhaust gas turbocharger according to claim 1, wherein the support wall (14) which projects into the flow duct (5) is arranged between the turbine wheel (9) and the compressor (3).

\* \* \* \* \*